(12) United States Patent
Van Der Heijden

(10) Patent No.: US 6,978,573 B2
(45) Date of Patent: Dec. 27, 2005

(54) GREENHOUSE

(75) Inventor: Loek Van Der Heijden, AE Wateringen (NL)

(73) Assignee: Excellent Glastuinbouwsystemen B.V., Wateringen (NL)

( * ) Notice: Subject to any disclaimer, the term of this patent is extended or adjusted under 35 U.S.C. 154(b) by 0 days.

(21) Appl. No.: 10/415,875

(22) PCT Filed: Nov. 9, 2001

(86) PCT No.: PCT/NL01/00812

§ 371 (c)(1),
(2), (4) Date: Sep. 29, 2003

(87) PCT Pub. No.: WO02/37949

PCT Pub. Date: May 16, 2002

(65) Prior Publication Data

US 2004/0049975 A1    Mar. 18, 2004

(30) Foreign Application Priority Data

Nov. 9, 2000 (NL) .................................... 1016575

(51) Int. Cl.[7] .............................................. A01G 9/14
(52) U.S. Cl. ...................................................... 47/17
(58) Field of Search ...................... 47/17, 29.5; 52/66, 52/69, 302.1

(56) References Cited

U.S. PATENT DOCUMENTS 1,689,131 A * 10/1928 Goodwin .......................... 52/1
5,655,335 A * 8/1997 Vermeer .......................... 52/66

FOREIGN PATENT DOCUMENTS

| BE | 1006145 | | 5/1994 | ............ A01G 9/14 |
| DE | 601208 | | 8/1934 | ............ A01G 9/24 |
| DE | 3137184 A1 | * | 3/1983 | ............ A01G 9/14 |
| DE | 19637778 A1 | * | 3/1998 | ............ A01G 9/14 |
| FR | 2.097.978 | | 2/1972 | ............ E04H 5/00 |
| FR | 2260282 | | 9/1975 | ............ A01G 9/14 |
| FR | 2557763 A | * | 7/1985 | ............ A01G 9/14 |
| JP | 405176638 A | * | 7/1993 | ............ A01G 9/14 |
| JP | 2003009674 A | * | 1/2003 | ............ A01G 9/14 |
| JP | 2003009677 A | * | 1/2003 | ............ A01G 9/24 |
| NL | 1003566 | | 1/1998 | ............ A01G 9/24 |
| NL | 1009086 C6 | * | 6/1998 | ............ A01G 9/24 |
| RU | 2087090 C1 | * | 8/1997 | ............ A01G 9/14 |

OTHER PUBLICATIONS

International Search Report for PCT/NL 01/00812, dated Mar. 11, 2002.

* cited by examiner

*Primary Examiner*—Son T. Nguyen

(74) *Attorney, Agent, or Firm*—Patterson & Sheridan LLP

(57) ABSTRACT

A greenhouse comprising two roof halves (4, 4') together forming a roof (3) of V-shaped cross-section, which can be moved between a closed position and an open position, a special feature of said greenhouse being the fact that the roof (4, 4') can be moved independently of each other both in upward and in downward direction relative to the closed position within certain limits.

17 Claims, 5 Drawing Sheets

GREENHOUSE

The invention relates to a greenhouse comprising two roof halves together forming a roof of V-shaped cross-section, which can be moved between a closed position and an open position.

Such a greenhouse, also referred to as "Dutch-type greenhouse", is known from French patent no. 2,097,978 (Henssler). The greenhouse that is disclosed therein comprises a roof which consists of two roof halves which are movable with respect to each other, each roof half being pivotable about a pivot pin on its side facing towards a roof-gutter and being connected to a lever linkage on its side facing towards a ridge beam. Said lever linkage is mounted on a shaft which extends parallel to the ridge beam. Rotation of the shaft makes it possible to move the roof between a closed position and an open position.

One drawback of the greenhouse that is known from the aforesaid French patent specification the fact that the roof can only be opened in one specific direction, so that the roof cannot be opened in all weather conditions. In particular rain, hail, snow and the like can easily enter the greenhouse via the open roof when the wind direction is unfavourable, with all the adverse consequences thereof for the crops that are being cultivated in the greenhouse. In addition, the known greenhouse only allows a limited roof opening.

The object of the invention is to overcome the drawbacks of the prior art, that is, to provide a greenhouse or "Dutch-type greenhouse" whose roof can be opened in all weather conditions, with an ideal roof opening being realised for optimally airing the interior of the greenhouse.

In order to accomplish that objective, a greenhouse of the kind referred to in the introduction is according to the invention characterized in that the roof halves can be moved independently of each other both in upward and in downward direction relative to the closed position within certain limits. In their respective open positions, the roof halves, which can each be moved (independently of each other) between the open position and the closed position, are preferably inclined at an angle varying between −10° and +60° with respect to with the closed position. The possibility of independent movement of one roof half with respect to the other has this advantage that the greenhouse can be opened in all weather conditions. Surprisingly, tests have shown that ideally, the two roof halves, which together form the V-shaped (in cross-section) roof should include an angle of 20–30°, preferably about 25°, with each other, so that an optimum balance is reached between two requirements: on the one hand, the area of the glass roof must be as small as possible, so that as little sunlight as possible is blocked by the glass (which would be an argument in favour of using a flat roof), whilst on the other hand the roof must provide optimum drainage, in particular of rain, in lateral direction (which would be an argument in favour of a maximally peaked roof). In the case of such an ideal angle between the two roof halves forming the roof of V-shaped cross-section, this means that a roof half in question can extend (substantially) upright with respect to the horizontal, for example, in the claimed angle range of its open position.

In one preferred embodiment of a greenhouse according to the invention, the roof halves can each be pivoted between the closed position and the open position about a pivot pin which is disposed near a gutter extending along one side of the roof. Said gutter preferably includes a section extending in the longitudinal direction thereof, with which a section of one roof half pivotally mates. More in particular, this means that the section of a roof half is pivotally accommodated in the section of the gutter, or vice versa, that is, that the section of the gutter is pivotally accommodated in the section of a roof half. The section of a roof half may pivotally mate with a longitudinal section which is not attached to the gutter, but to a separate support near the gutter.

In another preferred embodiment of a greenhouse according to the invention, an elongated supporting member is pivotally connected to a roof half near a first end and to an underlying support (for example a supporting beam) near a second end, the length of said supporting member being adjustable. Preferably, the length of the supporting member is made infinitely adjustable, for example by fitting the supporting member with a pneumatic or hydraulic piston/cylinder, wherein a lower or upper position of the piston in the cylinder corresponds with a short or long, as the case may be, position of the supporting member.

In another preferred embodiment of a greenhouse according to the invention, an elongated supporting member is pivotally connected to a roof half near one end and pivotally connected to an underlying support (for example a supporting beam) near a second end, said supporting member comprising a rack which can be moved forwards and backwards in the longitudinal direction thereof. The forward and backward movement of the rack in the longitudinal direction thereof in particular takes place by means of a pinion, whose teeth mesh with teeth of the rack. The pinion is connected to the support (supporting beam) by means of an additional support, for example.

In another preferred embodiment of a greenhouse according to the invention, an elongated supporting member is pivotally connected to a roof half near one end and pivotally connected to an underlying supporting beam near a second end, wherein the joint between the second end of the supporting member and the supporting beam can be moved forwards and backwards in the longitudinal direction of the supporting beam. In particular, the present greenhouse comprises pneumatic, hydraulic and/or electrical driving means for moving the joint between the second end of the supporting member and the supporting beam forwards and backwards in the longitudinal direction of the supporting beam. The driving means preferably include a rack which can be moved forwards and backwards in the longitudinal direction of the supporting beam, in which movement of the rack results in movement of the joint between the second end of the supporting member and the supporting beam.

The invention will now be explained in more detail with reference to the figures illustrated in a drawing, wherein FIG. 1 is a schematic cross-sectional view of a greenhouse according to the invention, with the roof halves in the closed position;

Figure 1:
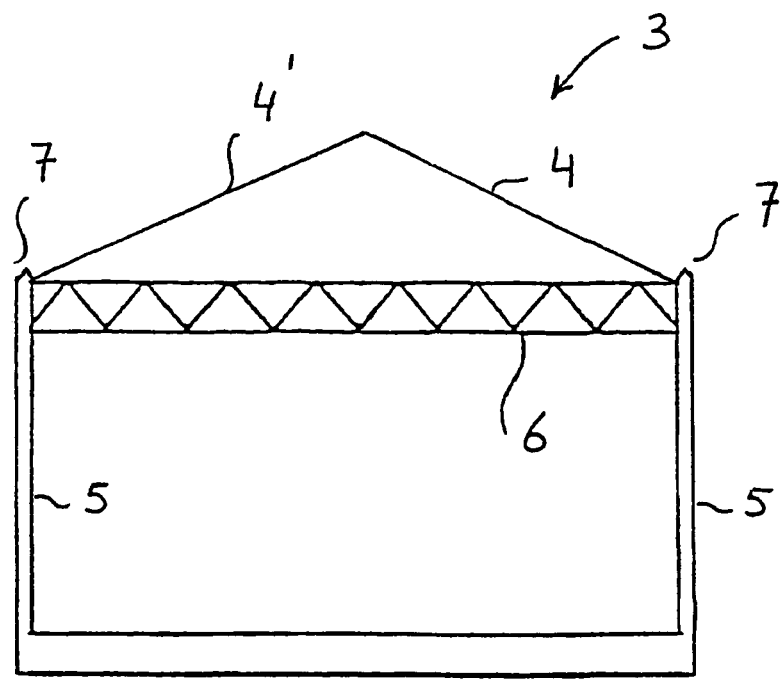
Figure 2:
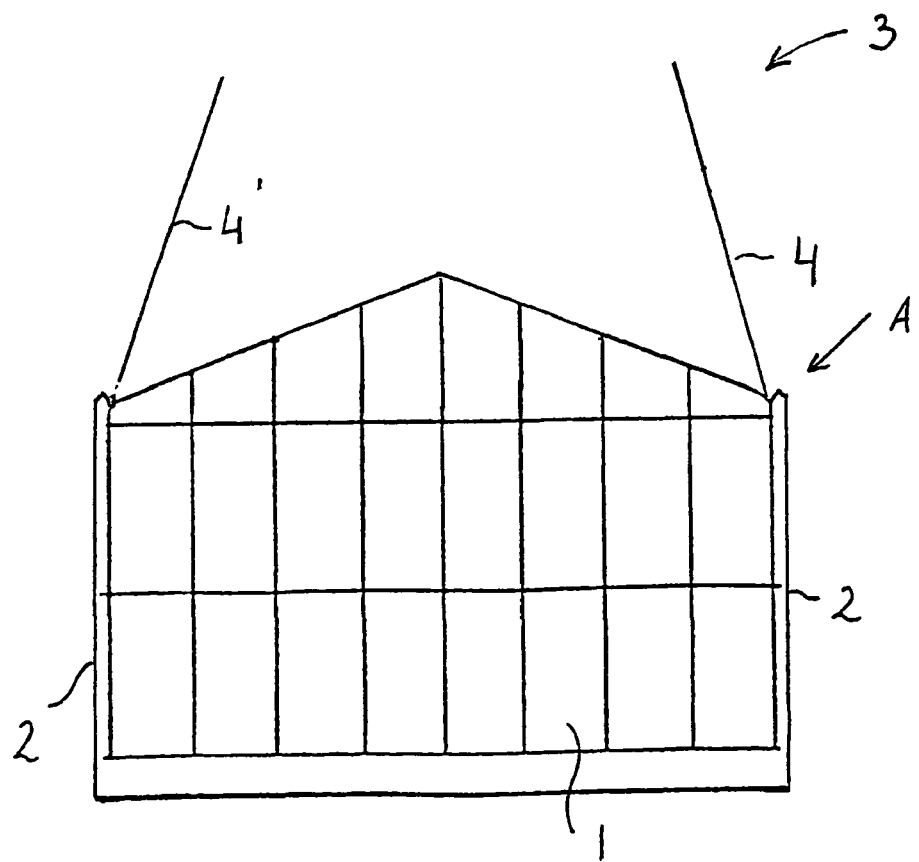
FIG. 2 shows the greenhouse of FIG. 1, albeit in schematic side elevation, with the roof halves in the open position.

FIGS. 1 and 2 show a greenhouse which is built up of side walls 1, a front wall and a rear wall 2, as well as a transparent roof 3 of V-shaped cross-section, the two roof halves 4, 4' of which are pivotable between an open position (FIG. 2) and a closed position (FIG. 1). The frame of the greenhouse consists of upright columns 5, between the upper ends of which horizontal open-frame girders 6 are mounted. The columns 5 and the open-frame girders 6 support gutters 7, which are mounted on the open-frame girders 6 on either side of the roof 3. Each roof half 4, 4' is built up of windows in a usual manner, a window including two mutually parallel longitudinal beams which are interconnected by glazing bars. The glazing bars, which are made of extruded aluminium, for example, support window panes, which may or may not be made of a hardened glass or a transparent plastic, in a known manner.

Figure 3:
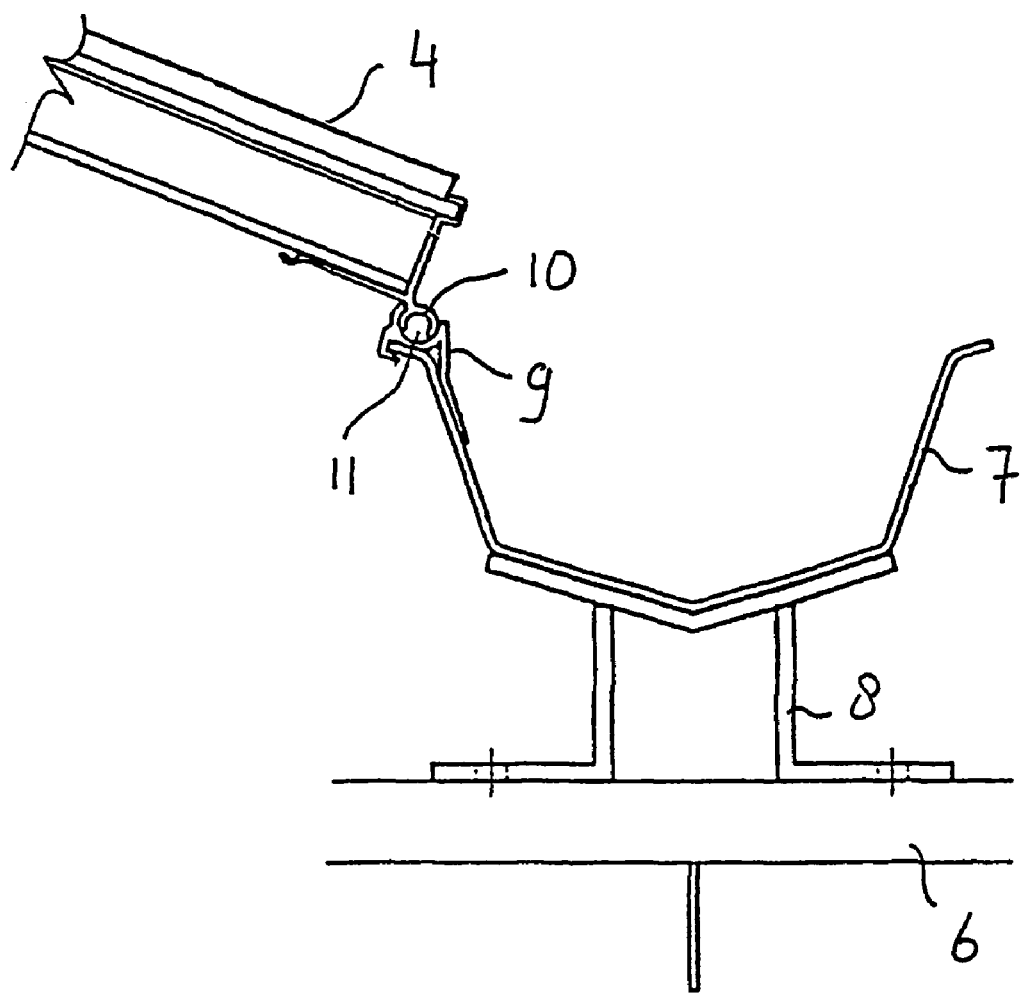
FIG. 3 shows a detail of the greenhouse of FIGS. 1 and 2, viz. a support of a roof half near a gutter of the greenhouse.

FIG. 3 shows a detail A of FIGS. 1 and 2, in which a gutter 7, which is connected to an open-frame girder 6 by means of a support 8, is provided with a section 9 extending in the longitudinal direction thereof. A section 10 of a roof half 4 is pivotally accommodated in said longitudinal section 9, which may be welded, clamped or screwed to gutter 7 or be formed in one piece therewith, so as to be able to pivot the roof half 4 from an open position to a closed position and vice versa. Said section 10 forms part of a lower longitudinal beam which, together with an upper longitudinal beam, glazing bars and window panes, forms the roof half 4. An identical construction is used for roof half 4'.

Figure 4:
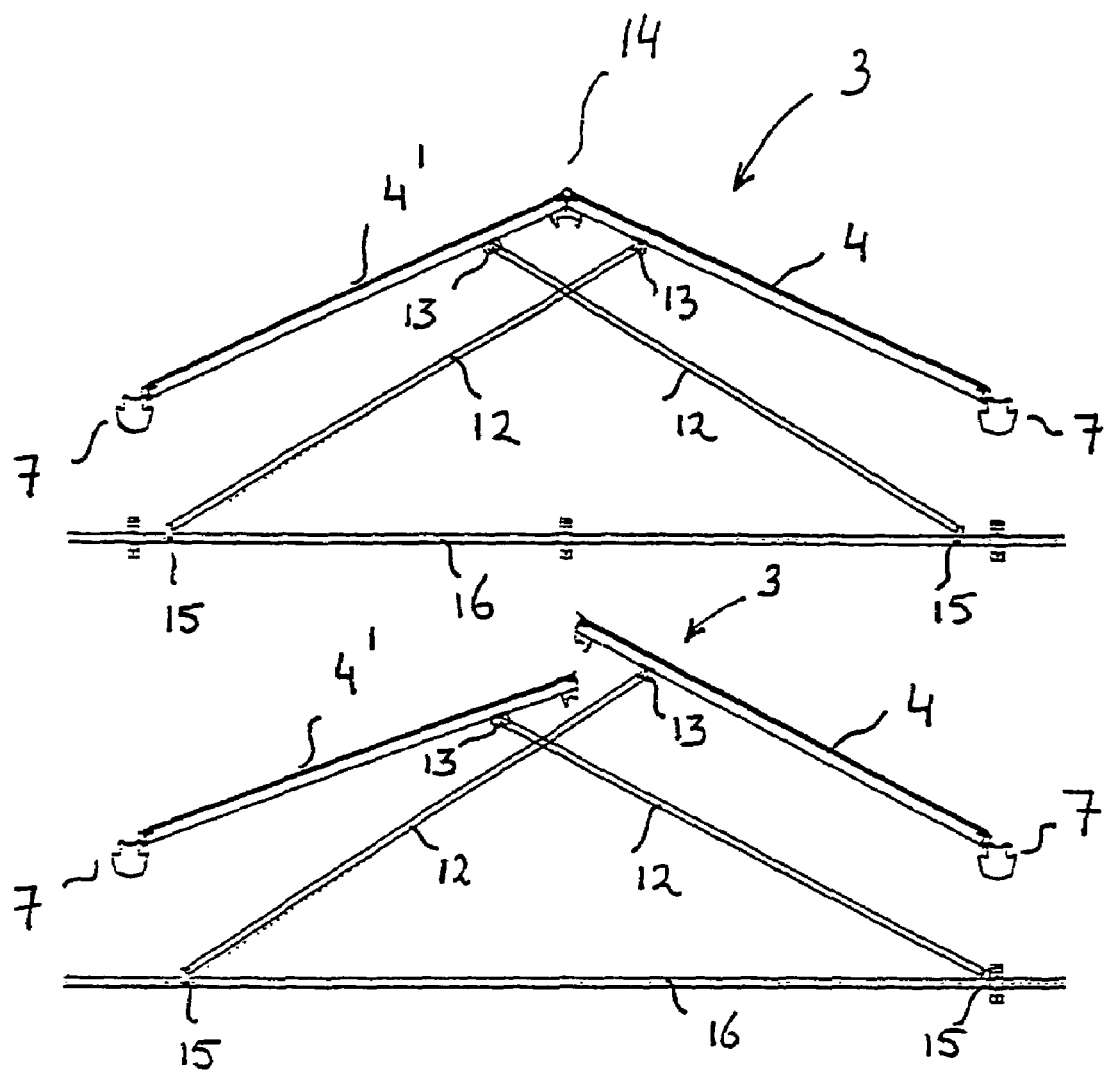
FIGS. 4 and 5 are schematic cross-sectional views of one or more greenhouses of the type shown in FIGS. 1 and 2, which illustrate the manner in which roof halves of the greenhouse can be pivoted independently of each other between an open position and a closed position.
Figure 5:
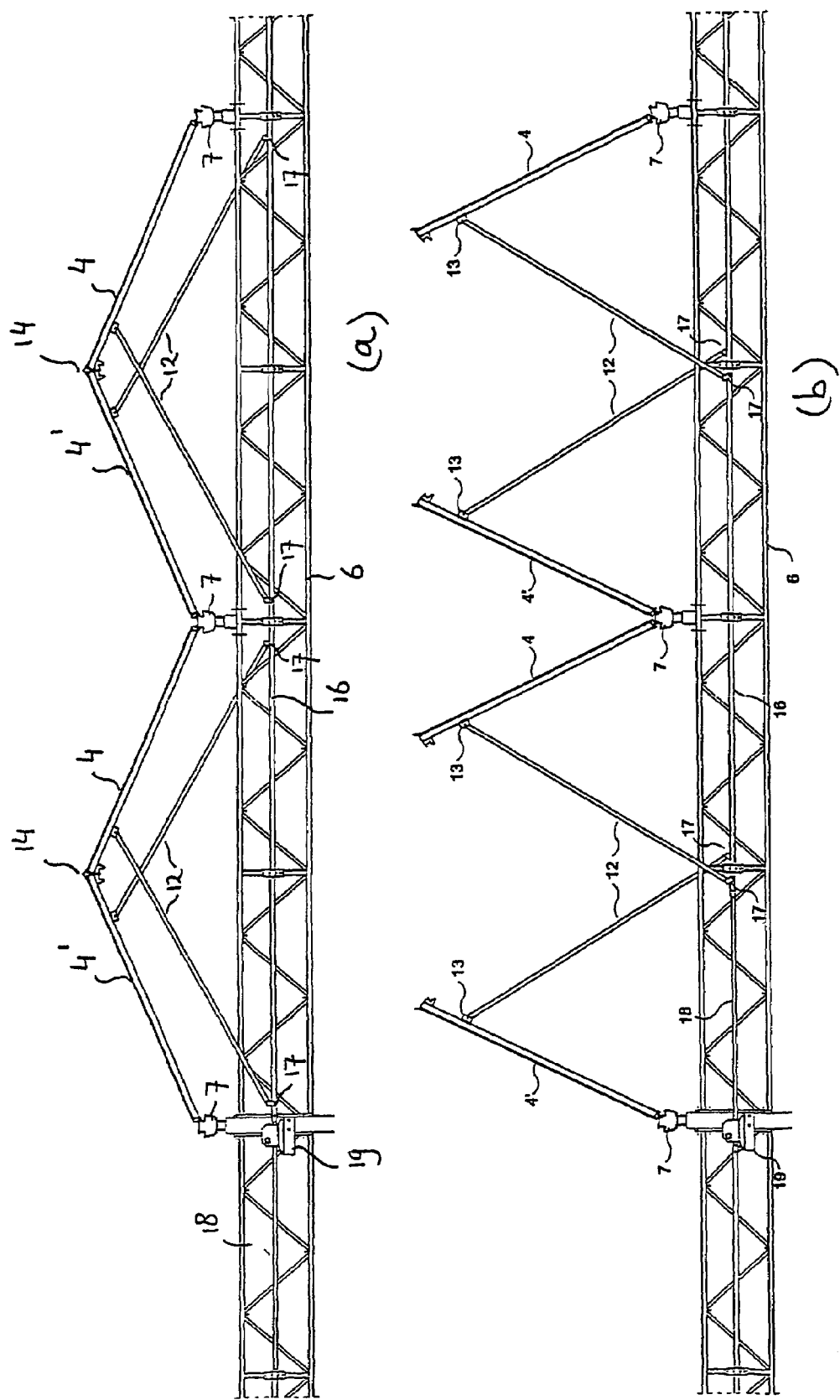

FIGS. 4 and 5 show the manner in which the roof halves 4, 4' can be pivoted independently of each other between an open position and a closed position. To this end, a respective elongated supporting member or rod 12 is pivotally connected about a pivot 13 near a first end to a side of a roof half 4, 4' that faces towards a ridge 14 of the roof 3. At a second end, the rod 12 is furthermore pivotally connected about a pivot 15 to a supporting beam 16 mounted on an open-frame girder 6 and the joint 17 between the second end of the rod 12 and the supporting beam 16 can be moved forwards and backwards in the longitudinal direction of the supporting beam 16. A rack 18 can be moved forwards and backwards in the longitudinal direction of the supporting bean 16 by means of a worm gearbox 19, to which end the worm gearbox 19 is fitted with worm gears/pinions whose teeth mesh with teeth of the rack 18. The forward and backward movement of the rack 18 under the influence of the worm gears in the worm gearbox 19 thus induces the movement of the joint 17 in the longitudinal direction of the supporting beam 16. Accordingly, the rod 12 will pivot about the pivots 13, 15, and as a consequence of that also the roof half 4, 4' in question will pivot between an open position and a closed position about its pivot 11 located near the gutter 7. Since each roof half 4, 4' is driven independently of the other roof half by a combination of a rod 12, a rack 18 and worm gears, each roof half 4, 4' can be moved from an open position to a closed position, and vice versa, independently of the other roof half. It is noted that a roof half 4, 4' can be pivoted to any open position, for example in dependance on the weather conditions, with this understanding that in said open position, the roof half 4, 4' is inclined at an angle varying between −10° and +60° with respect to the closed position thereof. FIG. 5 shows a situation in which two greenhouses of the type according to FIG. 4 are combined to form one greenhouse, FIG. 5a referring to a situation in which the roof 3 is closed and FIG. 5b referring to a situation in which the roof 3 is open. The racks 18 are clearly movable between two positions, wherein the roof 3 is closed in the extreme left-hand position of the two racks 18 (FIG. 5a) and the roof is maximally open in the extreme right-hand position of the two racks 18 (FIG. 5b).

Figure 6:
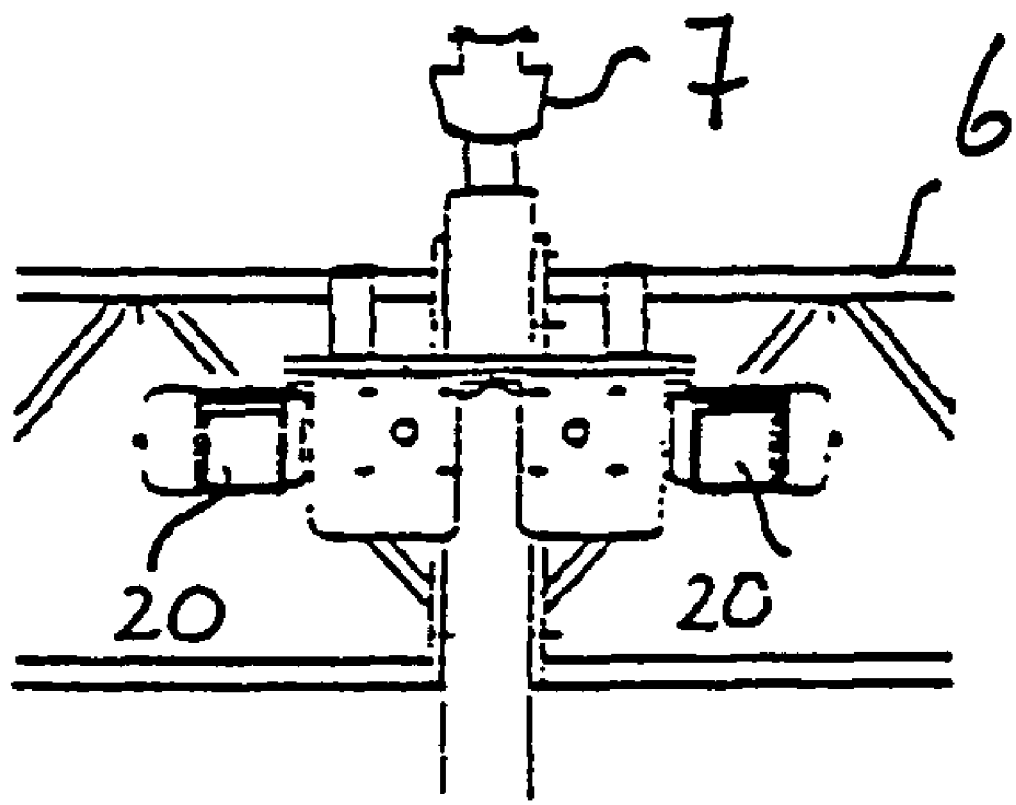
FIG. 6 shows a detail of FIG. 5.

FIG. 6 shows, in cross-sectional view, electric motors 20 mounted on either side of the open-frame girders 6 and the gutter 7, which electric motors are coupled to worm gears present in the worm gearbox 19 for driving the respective racks 18.

The invention is not restricted to the above-described embodiment, but it also extends to other variants that fall within the scope of the appended claims. Thus, it will be apparent to a person skilled in the art that one of the roof halves may be stationary, that is, non-movable (non-pivotable), whilst the other roof half can be moved (pivoted) between an open position and a closed position independently of the stationary roof half. Furthermore, it will be apparent within the framework of the invention that it is not limited to a greenhouse comprising one or more movable roof halves, but generally to a greenhouse comprise one or more movable roof parts.

What is claimed is:

1. A greenhouse comprising:
   a first roof half having a first end and a second end, the first end pivotally mounted to one side of the greenhouse; and
   a second roof half having a first end where the second ends of the roof halves meet together pivotally mounted to another side of the greenhouse, wherein the roof halves can be moved around the pivot points between a closed position and an open position and can be moved independently of each other around the pivot points in an upward and in a downward direction from the closed position.

2. The greenhouse according to claim 1, wherein the roof halves, in the open position thereof, are inclined at an angle varying between −10.degree. and +60.degree. with respect to the closed position independently of the position of the other roof half.

3. The greenhouse according to claim 1, wherein the roof halves can each be pivoted between the closed position and the open position about a pivot pin which is disposed near a gutter extending along one side of the roof.

4. The greenhouse according to claim 3, wherein said gutter includes a section extending in the longitudinal direction thereof, with which a section of one roof half pivotally mates.

5. The greenhouse according to claim 1, wherein an elongated supporting member is pivotally connected to a roof half near one end and pivotally connected to an underlying support near a second end, said supporting member comprising a rack which can be moved forwards and backwards in the longitudinal direction thereof.

6. The greenhouse according to claim 5, wherein the rack can be moved forwards and backwards in the longitudinal direction thereof by a pinion whose teeth mesh with teeth of the rack.

7. The greenhouse according to claim 1, wherein an elongated supporting member is pivotally connected to a roof half near one end and pivotally connected to an underlying supporting beam near a second end, wherein the joint between the second end of the supporting member and the supporting beam can be moved forwards and backwards in the longitudinal direction of the supporting beam.

8. The greenhouse according to claim 7, wherein said greenhouse comprises pneumatic, hydraulic and/or electrical driving means for moving the joint between the second end of the supporting member and the supporting beam forwards and backwards in the longitudinal direction of the supporting beam.

9. The greenhouse according to claim 8, wherein the driving means include a rack which can be moved forwards and backwards in the longitudinal direction of the supporting beam, in which movement of the rack results in movement of the joint between the second end of the supporting member and the supporting beam.

10. The greenhouse according to claim 1, wherein a ridge of a greenhouse roof is formed by an end of the first roof half and an end of the second roof half.

11. A roof for use with a greenhouse, the roof comprising:
a first roof member having an end pivotally connected to a first gutter member at a pivot point;
a second roof member having an end pivotally connected to a second gutter member at a pivot point, wherein the first and second roof members are moved independently of each other around the pivot points in an upward and in a downward direction from a closed position;
a first movable rod member pivotally connected to the first roof member, the first movable rod rotates the first roof member independently of the second roof member; and
a second movable rod member pivotally connected to the second roof member, the second movable rod rotates the second roof member independently of the first roof member, wherein another end of each roof member contacts and forms a ridge of the roof when the roof members are in the closed position.

12. The roof of claim 11, further including a longitudinal member operatively attached to each gutter member, wherein the longitudinal member accommodates the pivot connection between the gutter member and the roof member.

13. The roof of claim 12, wherein the longitudinal member is integrally formed to the gutter member.

14. A roof for use with a greenhouse, the roof comprising:
a first roof member having a first end pivotally connected to one side of the greenhouse and another portion of the first roof member pivotally connected to a first moveable member; and
a second roof member having an end pivotally connected to another side of the greenhouse and another portion of the second roof member pivotally connected to a second moveable member, wherein each roof member pivots around the end thereof independently of each other around the pivot points in an upward and in a downward direction from a closed position whereby the first roof member has a second end that converges with a second end of the second roof member to define the closed position.

15. The roof of claim 14, wherein the movable members cause the roof members to move independently of each other both in the upward and in the downward direction relative to the closed position.

16. A greenhouse comprising:
a first roof half having a first end pivotally mounted around a pivot pin disposed near a gutter extending along one side of the greenhouse; and
a second roof half having a first end pivotally mounted around a pivot pin disposed near a gutter extending along another side of the greenhouse, wherein the roof halves can be moved around the pivot points between a closed position and an open position where a second end of each roof half converge together and can be moved independently of each other around the pivot points in an upward and in a downward direction from the closed position, wherein an elongated supporting member is pivotally connected to each roof half near a first end and to an underlying support near a second end, the length of the supporting member being adjustable.

17. A roof for use with a greenhouse, the roof comprising:
a first roof member having an end pivotally connected to a first gutter member at a pivot point;
a second roof member having an end pivotally connected to a second gutter member at a pivot point, wherein the first and second roof members are moved independently of each other around the pivot points in an upward and in a downward direction from a closed position;
a first movable rod member pivotally connected to the first roof member, the first movable rod causes the first roof member to rotate around the first gutter member and moves the first roof member independently of the second roof member; and
a second movable rod member pivotally connected to the second roof member, the second movable rod causes the second roof member to rotate around the second gutter member and moves the second roof member independently of the first roof member, wherein another end of each roof member contacts and forms a ridge of the roof when the roof members are in the closed position.

* * * * *